United States Patent [19]

McCaul

[11] Patent Number: 4,704,412

[45] Date of Patent: Nov. 3, 1987

[54] IMPROVED HIGH NITRILE RESINS AND PROCESS OF PREPARING

[75] Inventor: Joseph P. McCaul, Mentor, Ohio

[73] Assignee: The Standard Oil Company, Cleveland, Ohio

[21] Appl. No.: 864,660

[22] Filed: May 19, 1986

Related U.S. Application Data

[63] Continuation-in-part of Ser. No. 777,151, Sep. 19, 1985, abandoned.

[51] Int. Cl.$^4$ .............................................. C08K 5/58
[52] U.S. Cl. .................................. 522/151; 524/180; 524/181; 524/182
[58] Field of Search ................ 522/151; 524/180, 181, 524/182

[56] References Cited

U.S. PATENT DOCUMENTS

| | | | |
|---|---|---|---|
| 3,907,932 | 9/1975 | Kennedy et al. | 524/181 |
| 4,174,043 | 11/1979 | Salame et al. | 215/1 |
| 4,379,878 | 4/1983 | Larkin | 524/181 |
| 4,409,350 | 10/1983 | Fujiwara et al. | 524/180 |
| 4,418,169 | 11/1983 | Gibbons et al. | 524/178 |
| 4,537,734 | 8/1985 | Morganstern | 522/151 |

OTHER PUBLICATIONS

John N. Helbert et al–J. Polymer Science: Polymer Chem. Edition, vol. 17, 49–58 (1979).

*Primary Examiner*—Veronica P. Hoke
*Attorney, Agent, or Firm*—M. F. Esposito; J. E. Miller; L. W. Evans

[57] ABSTRACT

A high nitrile polymer composition resistant to gamma radiation comprising a high nitrile resin, a first stabilizer comprising at least one organotin compound selected from the group consisting of an organotin compound having the formula

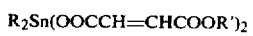

and an organotin thiol ester or mixtures thereof, and a second stabilizer having the formula:

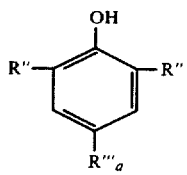

13 Claims, No Drawings

IMPROVED HIGH NITRILE RESINS AND PROCESS OF PREPARING

BACKGROUND OF THE INVENTION

This application is a continuation-in-part of Ser. No. 777,151, filed on Sept. 19, 1985 now abandoned.

The present invention is directed to color and radiation stabilization of high nitrile containing resins possessing reduced residual acrylonitrile monomer subsequent to irradiation. In particular, the present invention relates to a color and gamma stabilized copolymers and graft copolymers containing a high proportionate amount of olefinic nitriles containing minor amounts of a mixture comprising at least one organotin compound and an alkyl phenol. More particularly, the mixture can include a thiol ester such as an organotin thiol ester.

Many organotin compounds are kown to be effective color stabilizers for polyvinyl chloride resins. For example, U.S. Pat. Nos. 4,379,878 and 4,418,169 dated Apr. 12, 1983 and Nov. 29, 1983, respectfully, disclose various organotin compounds used as stabilizers for PVC polymers. However, the fact that an organotin compound is a color stabilizer for PVC resins does not necessarily mean that this material will also be effective as a stabilizer for high nitrile resins. See the article published in the *Journal of Polymer Sciences*, Volume 10, Part A-1 (1972), p. 3109, entitled "Coloration of PAN and PMAN by Organotin Compounds," which clearly indicated that certain organotin compounds, such as tributyltin methoxide, dibutyltin dimethoxide, and N-tributylstannyl, imidazole, act as destabilizers with respect to color in some nitrile resins.

In U.S. Pat. No. 3,907,932 dated Sept. 23, 1975, assigned to the assignee of the instant application, the use of specific organotin maleate compounds as thermal discoloration stabilizers for high nitrile containing polymers is disclosed. While the color stabilized nitrile resins of U.S. Pat. No. 3,907,932 are an improvement over conventional nonstabilized nitrile resins, there is significant room for improvement in both the color stabilization of the resin and its resistance to gamma radiation degradation. Any improvement in the gamma radiation degradation of the resin would improve its marketability in the medical field where sterilization of the packaged surgical or medical devices by gamma radiation is common place. In addition, any improvement in the resin which would reduce its yellowness would enhance its marketability as a substitute for glass containers. The present invention is directed to the use of a combination of at least one organotin stabilizer compound or mixture of organotin stabilizer compounds and an alkyl phenol to improve not only the color stability and gamma radiation resistance of the nitrile resins but also reduces its yellowness.

Moreover, while improvement in the color stability and gamma radiation resistance for these nitrile resins is important the reduction of the residual monomer content of these resins is equally desired. U.S. Pat. No. 4,174,043 teaches that residual nitrile monomer content for high nitrile content resin may be lowered by irradiating these resins with low dosage e-beam or gamma radiation followed by distending the irradiated resin to release NCH. However, high nitrile content resins comprising copolymers of acrylonitrile/methacrylate do not exhibit reduced residual acrylonitrile monomer upon irradiation as taught in U.S. Pat. No. 4,174,043. It is applicant's discovery that high nitrile content resins comprising copolymers of acrylonitrile/methacrylate such as Barex ® 210 when mixed with the stabilizer composition of the present invention will exhibit a dramatic decrease in the rate of residual nitrile monomer production upon irradiation with e-beam or gamma radiation. This results in high nitrile resins of copolymers of acrylonitrile/methacrylate which possess decreased residual nitrile content compared to similar nitrile resins which do not contain a stabilizer and have been irradiated.

SUMMARY OF THE INVENTION

It is the primary object of the present invention to provide a clear, color stable radiation resistant high nitrile containing polymer having low residual nitrile content.

It is another object of the present invention to provide a method for producing a low residual nitrile polymer composition which is clear, color stable and resistant to degradation by gamma radiation.

Additional objects, advantages, and novel features of the invention will be set forth in part in the description which follows and in part will become apparent to those skilled in the art upon examination of the following or may be learned by the practice of the invention. The objects and the advantages may be realized or obtained by means that the instrumentalities and combinations particularly pointed in the dependent claims.

To achieve the foregoing, and other objects and in accordance with the purpose of the present invention, as embodied and broadly described therein, the low residual nitrile monomer gamma radiation resistant polymer of the present invention comprises a mixture of a high nitrile content polymer, a first stabilizer comprising at least one organotin compound selected from the group consisting of:

ti  $R_2Sn(OOCCH=CHCOOR')_2$ wherein R is an alkyl radial containing less than about 10 carbon atoms, and R' is selected from the group consisting of alkyl, aryl, alkaryl, aralkyl, alkenyl, cycloalkyl, and cycloalkenyl radicals containing less than 22 carbon atoms and an organotin thiol ester or mixtures thereof, and a second stabilizer having the formula:

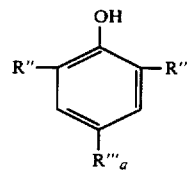

wherein R" is a branched alkyl radical containing less than 10 carbon atoms, R'" is an alkyl radical containing less than 10 carbon atoms, and a is a number selected from the group consisting of 0 and 1.

In particular, bis(mercapto-carboxylic) acid esters and mercaptoacetic acid esters, such as mono-m-octyltin-S,S',S"-tris(isooctyl mercaptoacetate) are useful as the thiol esters.

In another aspect of the present invention, a method for stabilizing a high nitrile polymer composition to improve its color fastness and degradation from gamma radiation during processing and lowers its residual nitrile monomer content comprises mixing (1) a high nitrile content polymer with (2) a first stabilizer comprising at least one organotin compound selected from the group consisting of:

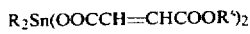

wherein R is an alkyl radical containing less than about 10 carbon atoms, and R' is selected from the group consisting of alkyl, aryl, alkaryl, aralkyl, alkenyl, cycloalkyl, and cycloalkenyl radicals containing less than 22 carbon atoms and an organotin thiol ester or mixture thereof and (3) a second stabilizer having the formula:

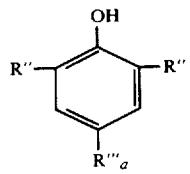

wherein R" is a branched alkyl radical containing less than 10 carbon atoms, R"" is an alkyl radical containing less than 10 carbon atoms, and a is a number selected from the group consisting of 0 and 1.

In a preferred embodiment of this aspect of the present invention, the thiol ester may be a bis(mercapto-carboxylic) acid ester.

The significance of the polymer composition of the present invention and the method of making this composition is that it provides a simple, fast, economic procedure and composition for producing a high nitrile content resin which possesses extremely low residual nitrile monomer content, improved color fastness, improved yellow index (i.e., reduction in yellowness thereby improving clarity) and improved resistance to degradation when exposed to gamma radiation. Moreover, the copolymer compositions of the present invention possess a significantly higher impact resistance (i.e., higher IZOD #) compared to conventional high nitrile containing copolymers. Accordingly, the copolymers of the present invention not only possess improved physical appearance, but also improved physical properties. The organotin stabilizer material and the second stabilizing component can be added in very low concentrations and still produce the improved properties in the nitrile polymers. These improved properties result in providing a broader market for high nitrile containing polymers. In particular, the improved gamma radiation resistance observed with the polymers of the present invention make them particularly suitable for packaging of medical devices which are sterilized by subjecting them to gamma radiation. Moreover, the improved clarity of polymers of the present invention makes them suitable as a substitute for glass container. Finally, the significant reduction in residual nitrile monomer or rate of production of residual nitrile monomer during irradiation in the final polymer product makes these monomers attractive for soft drink containers.

Reference will now be made in detail to the present preferred embodiments of the present invention.

DETAILED DESCRIPTION OF THE INVENTION

The polymer composition of the present invention comprises a mixture of a high nitrile content polymer, a first stabilizer comprising at least one organotin compound selected from the group consisting of:

and an organotin thiol ester or mixtures thereof, and a second stabilizer having the formula:

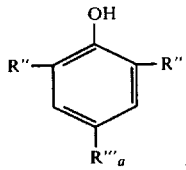

wherein R, R', R", R''' and a are defined as previously described.

In particular, the nitrile polymers useful in this invention include those resinous polymers and interpolymers produced by polymerizing a major proportion of a monounsaturated nitrile, such as acrylonitrile, and a minor proportion of another monovinyl monomer component copolymerizable with said nitrile in an aqueous or an organic medium and optionally in the presence of a pre-formed diene rubber which may be a homopolymer or a copolymer of a conjugated diene monomer.

The conjugated diene monomers useful in the present invention include butadiene-1.3, isoprene, choroprene, bromoprene, cyanoprene, 2,3-dimethylbutadiene-1,3, 2-ethyl-butadiene-1,3, 2,3-diethylbutadiene-1,3, and the like, and others. Most preferred for the purpose of this invention are butadiene and isoprene because of their ready availability and their excellent copolymerization properties.

The olefinically unsaturated nitriles useful in the present invention are the alpha, beta-olefinically unsaturated mononitriles which include acrylonitrile, alpha-chloroacrylonitrile, alphafluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which are useful in this invention includes one or more of the esters of olefinically unsaturated carboxylic acids, vinyl esters, vinyl ethers, alpha-olefins, vinyl aromatic monomers, and others. For a more detailed description of the types of nitrile polymers suitable in the practice of the present invention, reference is made to U.S. Pat. No. 3,907,932 herein incorporated by reference. Typically, the high nitrile polymers contain at least 50% monounsaturated nitrile and up to 50% of another monovinyl monomer component. Preferably, the nitrile component is present in the range of 70 to 90% weight percent.

In particular, the first stabilizer R$_2$Sn(OOCCH=CHCOOR')$_2$ may typically be one of the following:
dibutyltin bis(isooctyl maleate), dibutyltin bis(isopropyl maleate).
dibutyltin bis(lauryl maleate, dibutyltin bis(benzyl maleate).
dioctyltin bis(isooctyl maleate), dioctyltin bis(isopropyl maleate).
dioctyltin bis(lauryl maleate), dioctyltin bis(benzyl maleate).
dipropyltin bis(isooctyl maleate), dipropyltin bis(isopropyl maleate).
dipropyltin bis(benzyl maleate), dibutyltin bis(phenyl maleate).

dibutyltin bis(ethyl maleate), dibutyltin bis(allyl maleate).

dibutyltin bis(cinnamyl maleate), dibutyltin bis(cyclohexyl maleate).

dibutyltin bis(tolyl maleate), dioctyltin bis(amyl maleate), etc.

Typical second stabilizers which fall within the above formula are 2,6-di-tert-amyl-p-cresol; 2,6-di-tert-butyl-p-cresol; 2,6-di-isopropyl-4-ethylphenol; 2,6-di-tert-butyl-4-nonylphenol; 2,4,6-tri-isopropylphenol; 2-tert-butyl-4,6-di-isopropylphenol; 2,4,6-tri-tert-butylphenol; 2,6-di-isoamyl-4-ethylphenol; 2,6-di-tert-amyl-4-n-amylphenol; 2,6-di-isobutyl-p-cresol; 2,6-di-sec-butyl-4-n-propylphenol; 2,6-di-tert-butylphenol; 2,6-di-isopropylphenol; 2,6-di-tert-amylphenol; 2,6-di-isobutylphenol; etc. Preferred second stabilizers may include 2,6-di-tert-butyl-p-cresol; 2,4,6-tri-isopropylphenol and 2,6-di-tert-butylphenol.

For a more detailed description of the types of compounds suitable for use as stabilizers in the polymer composition of the present invention, reference is made to U.S. Pat. No. 4,418,169 herein incorporated by reference.

The first and second stabilizers must be present in the polymer composition in an amount sufficient to stabilize the high nitrile resin against gamma radiation degradation. Typically, the first stabilizer may be used in the amount of 0.1-10 parts by weight per 100 parts by weight of nitrile polymer. Preferably it may be used in the amount of about 2-4, in particular, 3 parts per 100 parts of nitrile polymer.

Typically, the second stabilizer may be employed in the amount of 0.05-1.0 parts by weight per 100 parts by weight nitrile polymer. Preferably, the amount used may be about 0.1-0.5 per 100 parts of nitrile polymer. Most preferably, the second stabilizer is present in the amount of about 0.1 part per 100 parts of polymer.

Thus the preferred low residual nitrile monomer, color and gamma radiation stable polymer compositions of this invention may comprise 100 parts by weight of a nitrile polymer; a stabilizing amount, typically 0.1-10 parts by weight of a first stabilizer comprising at least one organotin compound selected from the group consisting of $R_2Sn(OOCCH=CHCOOR')_2$ wherein R and R' are defined as described above and an organotin thiol ester or mixtures thereof; and 0.05-1.0 parts by weight of a second stabilizer having the formula

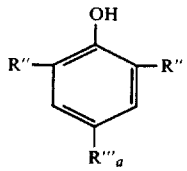

wherein R", R'" and a are defined as described previously.

The novel compositions of this invention may be formulated by such techniques as milling, dry blending, Banbury blending, or any other commonly employed formulating techniques.

One of the formulating methods which may be particularly convenient involves the formation of a stabilizer composition containing both the first stabilizer and the second stabilizer. This stabilizer composition may later be added to, and thoroughly mixed with the nitrile polymer. Where this technique is employed, the stabilizer composition may typically comprise stabilizing amounts of the stabilizers, typically 0.1-10 parts by weight of the first stabilizer and 0.05-1.0 parts by weight of the second stabilizer. Preferably, it may comprise about 2-4, in particular, 3 parts of the first stabilizer and about 0.1-0.5, in particular, 0.1 parts of the second stabilizer.

Whatever formulating technique be employed, it will be desirable to substantially completely and uniformly disperse the first stabilizer and the second stabilizer throughout the nitrile polymer composition. Thus, in accordance with certain of its aspects, this invention relates to a method for preparing novel color and gamma radiation stable nitrile polymer compositions which comprises blending together about 100 parts by weight of a nitrile polymer; 0.1-10 parts by weight of the first stabilizer as defined above, and 0.05 to 1.0 parts of the second stabilizer as defined above.

In a preferred embodiment of the present invention the color and gamma radiation stable polymer composition of the present invention includes an organotin thiol ester such as bis(mercapto-carboxylic acid esters) characterized by the formula $R_2Sn(SR"COOR')_2$ wherein R and R' represent monovalent hydrocarbon radicals and R" represents a divalent hydrocarbon radical. In addition, the organotin thiol ester can be a monooctyl tin compound represented by the general formula n-$C_8H_{17}Sn(SCH_2COOR)_3$ wherein R represents an alkyl group containing 8 carbon atoms which can be of linear or branched configuration. For a more detailed description of these types of thiol esters useful in the practice of the present invention, reference is made to U.S. Pat. No. 4,379,878 herein incorporated by reference.

In order to illustrate the novel feature of the present invention and to demonstrate the unexpected results obtained through its practice, the following examples are set forth.

EXAMPLES 1-24

In these examples a high nitrile copolymer (acrylonitrilemethymethacrylate copolymer) identified by the Trademark Barex ® 210 in powder form was modified by adding Gammashield ® 401 produced by M&T Chemicals, Inc. The Barex ® 210 copolymer was obtained as an off-the-shelf item. For a detailed description of the method of preparing this copolymer, see U.S. Pat. No. 3,426,102, herein incorporated by reference. Gammashield ® 401 is a stabilizer for PVC resin comprising an organotin compound, thiol ester (organotin thiol ester), and alkylphenol.

There is no criticality in the procedure used for adding the stabilizer to the copolymer. In the examples, the stabilizer was added to a container filled with the copolymer and the ingredients were mixed by hand to form a substantially uniform mixture.

Samples of Barex ® 210 with varying levels of Gammashield ® 401 (0, 0.5, 1, and 2 parts per hundred parts of Resin (pHr) added thereto) were prepared by the above described procedure. The samples were then hot milled at 320° C. for about 1 to 5 minutes and cold press molded at about 10,000 psi. The molded resins were then cut in half and one set was irradiated with 2.5 megarads of gamma radiation. The results are set forth below in Table I.

TABLE I

| Example* | Amt of Stabilizer (pHr) | Irradiation | Trans % | Haze % | Y.I. | Color (L #) | Color (a #) | Color (b #) |
|---|---|---|---|---|---|---|---|---|
| 1 | 0 | None | 77.43 | 11.24 | 35.83 | 88.01 | −3.33 | 18.98 |
| 2 | 0 | " | 83.96 | 8.28 | 20.56 | 91.64 | −2.38 | 11.49 |
| 3 | 0 | " | 87.40 | 7.82 | 11.88 | 93.49 | −1.51 | 6.82 |
| 4 | .5 | " | 84.82 | 10.16 | 22.05 | 92.10 | −3.34 | 12.70 |
| 5 | .5 | " | 87.93 | 7.26 | 12.57 | 93.77 | −2.03 | 7.41 |
| 6 | .5 | " | 89.90 | 5.50 | 7.13 | 94.84 | −1.20 | 4.25 |
| 7 | 1 | " | 84.25 | 9.77 | 22.12 | 91.79 | −3.43 | 12.74 |
| 8 | 1 | " | 87.93 | 7.61 | 12.32 | 93.78 | −2.09 | 7.30 |
| 9 | 1 | " | 81.99 | 5.32 | 6.90 | 94.88 | −1.22 | 4.15 |
| 10 | 2 | " | 84.42 | 11.15 | 20.34 | 91.88 | −3.20 | 11.84 |
| 11 | 2 | " | 87.73 | 8.66 | 11.50 | 96.67 | −1.95 | 6.81 |
| 12 | 2 | " | 89.96 | 7.06 | 6.59 | 94.85 | −1.16 | 3.97 |
| 13 | 0 | Yes | 34.01 | 10.33 | 95.19 | 58.31 | 6.06 | 28.64 |
| 14 | 0 | " | 54.67 | 8.61 | 60.25 | 73.95 | −0.73 | 25.24 |
| 15 | 0 | " | 70.23 | 6.68 | 36.46 | 84.04 | −2.61 | 17.92 |
| 16 | .5 | " | 49.03 | 9.30 | 75.40 | 70.03 | −0.34 | 29.69 |
| 17 | .5 | " | 67.66 | 6.81 | 46.22 | 82.26 | −3.74 | 22.79 |
| 18 | .5 | " | 78.85 | 5.63 | 27.02 | 88.81 | −3.34 | 14.80 |
| 19 | 1 | " | 55.23 | 11.00 | 68.91 | 74.32 | −2.28 | 29.58 |
| 20 | 1 | " | 72.17 | 7.95 | 40.75 | 84.95 | −4.27 | 21.45 |
| 21 | 1 | " | 90.02 | 6.41 | 23.12 | 90.54 | −3.37 | 13.06 |
| 22 | 2 | " | 62.73 | 11.40 | 60.67 | 79.22 | −4.00 | 28.54 |
| 23 | 2 | " | 76.73 | 9.30 | 34.95 | 87.61 | −4.49 | 18.94 |
| 24 | 2 | " | 84.30 | 7.06 | 19.93 | 91.82 | −3.20 | 11.52 |

*Examples 1, 4, 7, 10, 13, 16, 19 and 22 molded samples ⅛ inch thick
*Examples 2, 5, 8, 11, 14, 17, 20 and 23 molded samples 1/16 inch thick
*Examples 3, 6, 9, 12, 15, 18, 21 and 24 molded samples 1/32 inch thick The percent light transmission was measured with the Hunter Lab Colormeter and the yellowness index (Y.I.) and percent haze were determined by ASTM Standard Methods D 1925-70 and D 1003-61, respectively. The L, a, and b numbers which indicate the degree of lightness (L), green-red (a) and yellow-blue (b) of the film respectively, were determined from using the Hunter L, a, b Color Solid Standard.

It is apparent from the examples shown in Table I that the stabilized resins of the present invention have improved color fastness and stability to gamma radiation. In particular, the yellow-blue (b) number dramatically decreases resulting in a product which is substantially less yellow.

EXAMPLES 25–28

A Barex ® 210 prepared in the same manner as the Barex ® 210 resin used in Examples 1–24 was modified by blending a Gammashield ® 801 with the resin in substantially the same manner described in Examples 1–24, Gammashield ® 801 is also produced by M&T Chemicals, Inc. and comprises an organotin compound, thiol ester (organotin thiol ester), and alkyl phenol. The results set forth below in Table II show that Gammashield ® 801 increases the color fastness, reduces the yellowness, and increases the gamma radiation degradation resistance for high nitrile containing polymers works. In addition, impact resistance test for the copolymers of the present invention is significantly improved as can be readily seen from a comparison of the results of Example 29 (control) and Examples 25 and 26.

TABLE II

| Example | Amt of Stabilizer (pHr) | Irradiation | Trans % | Haze % | Y.I. | Color (L #) | Color (a #) | Color (b #) | Notched Izod (ft. lbs/in) |
|---|---|---|---|---|---|---|---|---|---|
| 25 | 1 | No | 84.83 | 26.06 | 9.09 | 92.11 | −1.36 | 5.23 | 2.41 |
| 26 | 2 | No | 85.62 | 27.89 | 8.11 | 92.53 | −1.25 | 4.69 | 2.51 |
| 27 | .1 | No | 83.75 | 31.22 | 10.21 | 91.52 | −1.37 | 5.78 | 2.14 |
| 28 | .2 | No | 83.90 | 32.43 | 9.94 | 91.60 | −1.40 | 5.64 | 2.03 |
| 29 | 0 | No | 82.30 | 31.08 | 12.66 | 91.22 | 1.44 | 7.04 | 1.97 |

The following examples are set forth below to further illustrate the present invention. These examples demonstrate that the resin of the present invention possess extremely low residual nitrile monomer content subsequent to irradiation when compared to irradiated resins which do not contain the stabilizer of the present invention.

EXAMPLES 29–43

A Barex ® 210 resin prepared in the same manner described in Example 1-24 was modified by blending Gammashield ® 801 with the resin. Gammashield ® 801 as previously described is produced by M&T Chemicals, Inc. and comprises an organotin stabilizer, thiol ester and alkyl phenol. The results set forth in Table III below clearly demonstrate that the presence of Gammashield ® 801 stabilizer dramatically reduces the rate of production of residual nitrile monomer content (i.e. acrylonitrile) in the irradiated Barex ® 210 resin. Examples 20-31 are control samples without Gammashield ® 801. Examples 32-43 are samples containing varying amounts of Gammashield ® 801 as indicated.

TABLE III

| Examples | [Gamma Shield] | Dosage MR*** | Control* ppb | E[AN]* Irrad ppb | [AN]-Cont** (ppb/MM2) | [AN]-Irr** (ppb/MM2) | [AN]Irr-[AN]Cont |
|---|---|---|---|---|---|---|---|
| 29 | 0.0 | 1.0 | 3.6 | 7.9 | 0.002347 | 0.007234 | 0.004887 |
| 30 | 0.0 | 2.5 | 4.6 | 9.2 | 0.002993 | 0.008120 | 0.005127 |
| 31 | 0.0 | 5.0 | 4.8 | 12.0 | 0.003306 | 0.011310 | 0.008004 |
| 32 | 0.1 | 1.0 | 3.2 | 8.0 | 0.002062 | 0.007067 | 0.005005 |
| 33 | 0.1 | 2.5 | 3.6 | 7.0 | 0.002333 | 0.006195 | 0.003862 |
| 34 | 0.1 | 5.0 | 3.4 | 9.0 | 0.002195 | 0.008115 | 0.005920 |
| 35 | 0.2 | 1.0 | 3.6 | 6.2 | 0.002320 | 0.005521 | 0.003201 |
| 36 | 0.2 | 2.5 | 3.8 | 7.8 | 0.002520 | 0.007138 | 0.004618 |
| 37 | 0.2 | 5.0 | 3.5 | 9.6 | 0.002313 | 0.008704 | 0.006391 |
| 38 | 1.0 | 1.0 | 2.8 | 5.9 | 0.002484 | 0.003809 | 0.001325 |
| 39 | 1.0 | 2.5 | 2.5 | 6.7 | 0.002232 | 0.004434 | 0.002202 |
| 40 | 1.0 | 5.0 | 2.9 | 6.9 | 0.001860 | 0.006211 | 0.004351 |
| 41 | 2.0 | 1.0 | 5.3 | 4.4 | 0.003417 | 0.003915 | 0.000498 |
| 42 | 2.0 | 2.5 | 3.3 | 3.3 | 0.002129 | 0.003005 | 0.000876 |
| 43 | 2.0 | 5.0 | 2.5 | 3.5 | 0.001662 | 0.003229 | 0.00.1567 |

*E[AN] = extracted acrylonitrile
**[AN] = acrylonitrile content of resin
***MR = Megarads The results of Table III clearly demonstrate that the addition of Gammashield ® to the high nitrile content resin (i.e. Barex ® 210) dramatically reduces the rate of residual monomer production caused by low dosage irradiation of the resin.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gamma radiation sterilized polymer composition comprising a polymer wherein the predominant monomer by weight is derived from an unsaturated nitrile and having incorporated in the composition prior to said gamma radiation sterilization a stabilizer system comprising at least one organotin compound selected from the group consisting of:

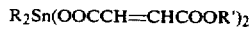

wherein R is an alkyl radical containing less than about 10 carbon atoms, and R' is selected from the group consisting of alkyl, aryl, alkaryl, aralkyl, alkenyl, cycloalkyl, and cycloalkenyl radicals containing less than 22 carbon atoms, and an organotin thiol ester or mixtures thereof, and a second stabilizer having the formula:

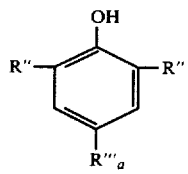

wherein R" is a branched alkyl radical containing less than 10 carbon atoms, R''' is an alkyl radical containing less than 10 carbon atoms, and a is a number selected from the group consisting of 0 and 1, which is present in an amount which is effective to inhibit the yellowing an nitrile monomer formation produced by said gamma radiation.

2. The polymer composition of claim 1 further comprising an organotin thiol ester compound has the formula $$R_2Sn(SR''COOR')_2$$

wherein R and R' represent monovalent hydrocarbon radicals and R" represents a divalent hydrocarbon radical.

3. The polymer composition of claim 1 wherein the thiol ester is a mono-n-octyl tin compound having the formula n-$C_8H_{17}$Sn($SCH_2COOR$)$_3$ wherein R is an alkyl group containing 8 carbon atoms.

4. The polymer composition of claim 3 wherein the thiol ester is mono-n-octyltin $S_1S'_1S''$ tris(isooctyl mercaptoacetate).

5. The polymer composition of claim 1 wherein the polymer comprises a copolymer of acrylonitrile and methylmethacrylate.

6. The polymer composition of claim 1 wherein the nitrile component of the copolymer is at least 50 weight percent.

7. The composition of claim 1 wherein the second stabilizer is present in the amount of about 0.05–1.0 parts by weight per 100 parts by weight nitrile polymer.

8. The composition of claim 7 wherein the first stabilizer is present in the amount of about 0.1–10 parts by weight per 100 parts by weight of nitrile polymer.

9. A method for the gamma radiation sterilization of polymers wherein the predominant monomer by weight is derived from an unsaturated nitrile, the improvement comprising incorporating into the polymer prior to gamma radiation a stabilizer system comprising a first stabilizer comprising at least one organotin compound selected from the group consisting of compounds of the formula $R_2Sn(OOCCH=CHCOOR')_2$ wherein R is an alkyl radical having less than about 10 carbon atoms and R' is a hydrocarbon radical selected from the group consisting of alkyl, aryl, alkaryl, aralkyl, alkenyl, cycloalkyl, and cycloalkenyl radicals containing less than about 22 carbon atoms, and an organotin thiol ester and mixtures thereof and a second stabilizer having the formula

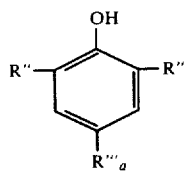

wherein R″ is a branched alkyl radical containing less than about 10 carbon atoms, R‴ is an alkyl radical containing less than about 10 carbon atoms, and a is a number selected from the group consisting of 0 and 1, which is present in an amount which is effective to inhibit the yellowing and nitrile monomer formation produced by said gamma radiation treatment.

10. The process of claim 1 wherein said thiol ester is characterized by the formula $R_2Sn(SR''COOR')_2$ wherein R and R′0 represent monovalent hydrocarbon radicals and R″ represents a divalent hydrocarbon radical.

11. The process of claim 1 wherein said thiol ester is a mono-n-octyl tin compound having the formula n-$C_8H_{17}Sn(SCH_2COOR)_3$ wherein R is an alkyl group containing 8 carbon atoms.

12. The process of claim 11 wherein said thiol ester is mono-n-octyltin $S_1S'_1S''$ tri(isooctyl mercaptoacetate).

13. The process of claim 1 wherein the polymer comprises a copolymer of acrylonitrile and methyl methacrylate.

* * * * *

UNITED STATES PATENT AND TRADEMARK OFFICE
CERTIFICATE OF CORRECTION

PATENT NO. : 4,704,412
DATED : November 3, 1987
INVENTOR(S) : Joseph P. McCaul

It is certified that error appears in the above-identified patent and that said Letters Patent is hereby corrected as shown below:

Column 12, line 3, "1" should read -- 9 --.

Column 12, line 5, delete "0".

Column 12, line 8, "1" should read -- 9 --.

Signed and Sealed this

Fifth Day of July, 1988

Attest:

DONALD J. QUIGG

Attesting Officer     Commissioner of Patents and Trademarks